US006631414B2

(12) United States Patent
Bullock et al.

(10) Patent No.: US 6,631,414 B2
(45) Date of Patent: *Oct. 7, 2003

(54) SYSTEM AND METHOD FOR ESTABLISHING VIRTUAL AND PHYSICAL CONNECTION PATHS BETWEEN PEER SYSTEMS

(75) Inventors: Mark C. Bullock, Apalachin, NY (US); Glenn W. Davis, Vestal, NY (US); Franklin A. Gruber, Vestal, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/144,757

(22) Filed: Aug. 31, 1998

(65) Prior Publication Data

US 2002/0032778 A1 Mar. 14, 2002

(51) Int. Cl.[7] ............................................... G06F 15/16
(52) U.S. Cl. ...................... 709/227; 709/221; 709/222; 709/228
(58) Field of Search .................. 709/200, 201, 709/203, 217, 219, 220, 227, 228, 232, 229, 237, 245, 246, 248, 221

(56) References Cited

U.S. PATENT DOCUMENTS

| 4,471,489 A | * | 9/1984 | Konetski et al. ............. 375/222 |
| 4,578,533 A | * | 3/1986 | Pierce ...................... 379/93.31 |
| 4,928,305 A | | 5/1990 | Yui .............................. 379/98 |
| 5,463,616 A | * | 10/1995 | Kruse et al. ................. 370/276 |
| 5,481,696 A | | 1/1996 | Lomp et al. ................. 395/500 |
| 5,604,794 A | | 2/1997 | Vogel et al. ................... 379/94 |
| 5,682,325 A | * | 10/1997 | Lightfoot et al. |
| 5,689,550 A | * | 11/1997 | Garson et al. ................. 379/89 |
| 6,118,785 A | * | 9/2000 | Araujo et al. ................ 370/401 |

* cited by examiner

Primary Examiner—Frantz B. Jean
(74) Attorney, Agent, or Firm—Shelley M. Beckstrand (57) ABSTRACT

A system and method for dedicating an externally configurable modem under system software control at a local peer for communication with one, single, predetermined remote peer, thereby providing the equivalent of a dedicate line by operating a single modem at the local node. The modem to be dedicated to the predetermined, single remote node is initialized to answer mode and reconfigured to originate mode when needed. The process of configuring the modem of the local node establishes a point-to-point protocol (PPP) route for establishing a physical connection path to the remote node.

10 Claims, 6 Drawing Sheets

SYSTEM AND METHOD FOR ESTABLISHING VIRTUAL AND PHYSICAL CONNECTION PATHS BETWEEN PEER SYSTEMS

BACKGROUND OF THE INVENTION

1. Technical Field of the Invention

This invention pertains to communications between peer nodes in a network. More particularly, it relates to incoming and outgoing communications between peer nodes requiring only a single line per dedicated peer.

2. Background Art

Dial-on-demand is a communications protocol where communications connections are made only when there is a need to communicate between two peers, such as between two peer computer systems in a communications network. This protocol, or technique, is widely implemented in the industry for dial-up servers.

For many implementations, to keep cost down, there are more remote locations than physical lines. This then creates the potential problem that a call can not be initiated due to all lines being busy. For mission critical communications the general solution is to dedicate a line to each critical peer. For those cases where the call could be initiated from either peer, two lines would be required with one enabled for answer mode and the second enabled for dial-out mode. This has two problems: (1) the cost for two lines and (2) the additional complexity to configure two lines.

Consequently, it is an object of the invention to provide an improved dial-on-demand (DOD) communications method and system.

It is a further object of the invention to provide an improved dial-on-demand communications method and system which reduces the cost and complexity of mission critical dedicated peer to peer communications.

It is a further object of the invention to provide a dedicated peer to peer connection which requires only a single line for both incoming and dial-out communications.

SUMMARY OF THE INVENTION

In accordance with the invention, communications between peer nodes in a network is accomplished by establishing a single line per dedicated peer, initially setting up the line for answer mode, thereby enabling the remote peer to initiate a call, by reconfiguring the line for dial out when the local peer needs to call the remote peer, and upon completion of a call initiated by the local peer, by returning the line to answer mode.

Other features and advantages of this invention will become apparent from the following detailed description of the presently preferred embodiment of the invention, taken in conjunction with the accompanying drawings.

BEST MODE FOR CARRYING OUT THE INVENTION

Abbreviations

Abbreviations used in the text and drawings include the following:

| | |
|---|---|
| DOD | Dial-on-Demand |
| DSR | Data Set Ready |
| ENQ | Enqueue |
| ENDTCPPTP | End TCP point-to-point profile (an AS/400 command) |
| IFC | Interface |
| I/O | Input/Output |
| IOCTL | I/O control: UNIX standard terminology for a sockets message |
| IOP | Input Output Processor |
| IP | Internet Protocol |
| LCP | Link Control Protocol, a sub-protocol of PPP. |
| MI | Machine Interface |
| NAM | Network Access Manager |
| NCP | Network Control Protocol, a sub-protocol of PPP |
| PPP | Point-to-Point protocol |
| QSYSWRK | An AS/400 subsystem or job partition name |
| QTCP | An AS/400 job qualifier name |
| QTCPIPMON | An AS/400 program: the name of the job |
| QTOCMON | The name of the message monitor program in job QTCPIPMON for messages coming from below the MI |
| QTOCPPCM | The PP connection manager program |
| QTOCPPSK | Program for configuring point to point interfaces |
| REQIO | AS/400 I/O control request |
| RTE | Route |
| SLIC | An AS/400 term for code below the MI |
| STRTCPPTP | Command on AS/400: start TCP point-to-point profile |
| TCP | Transmission Control Protocol |

Figure 1A:
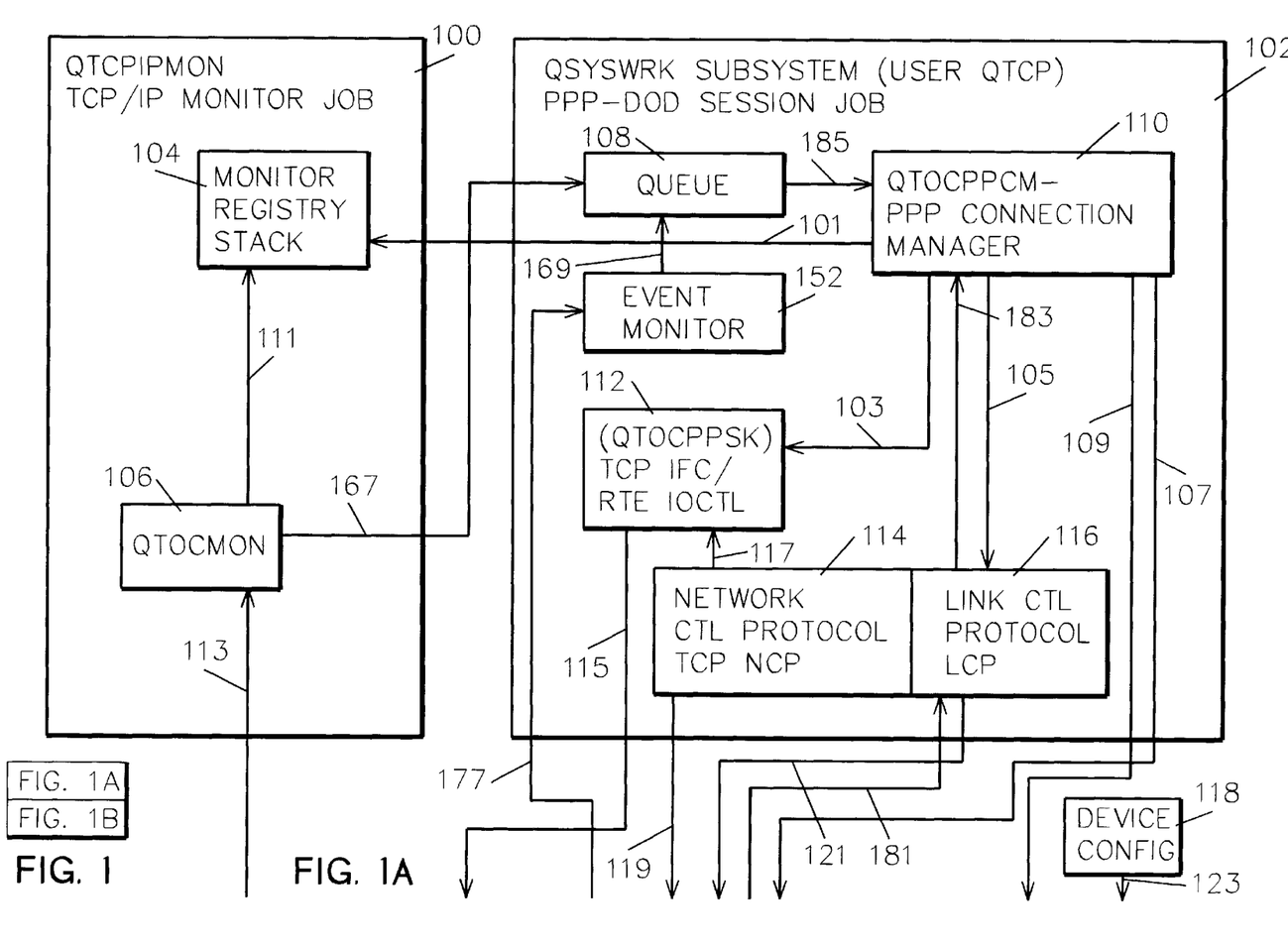
FIG. 1 illustrates the functional components of system of the preferred embodiment of the invention.
Figure 1B:
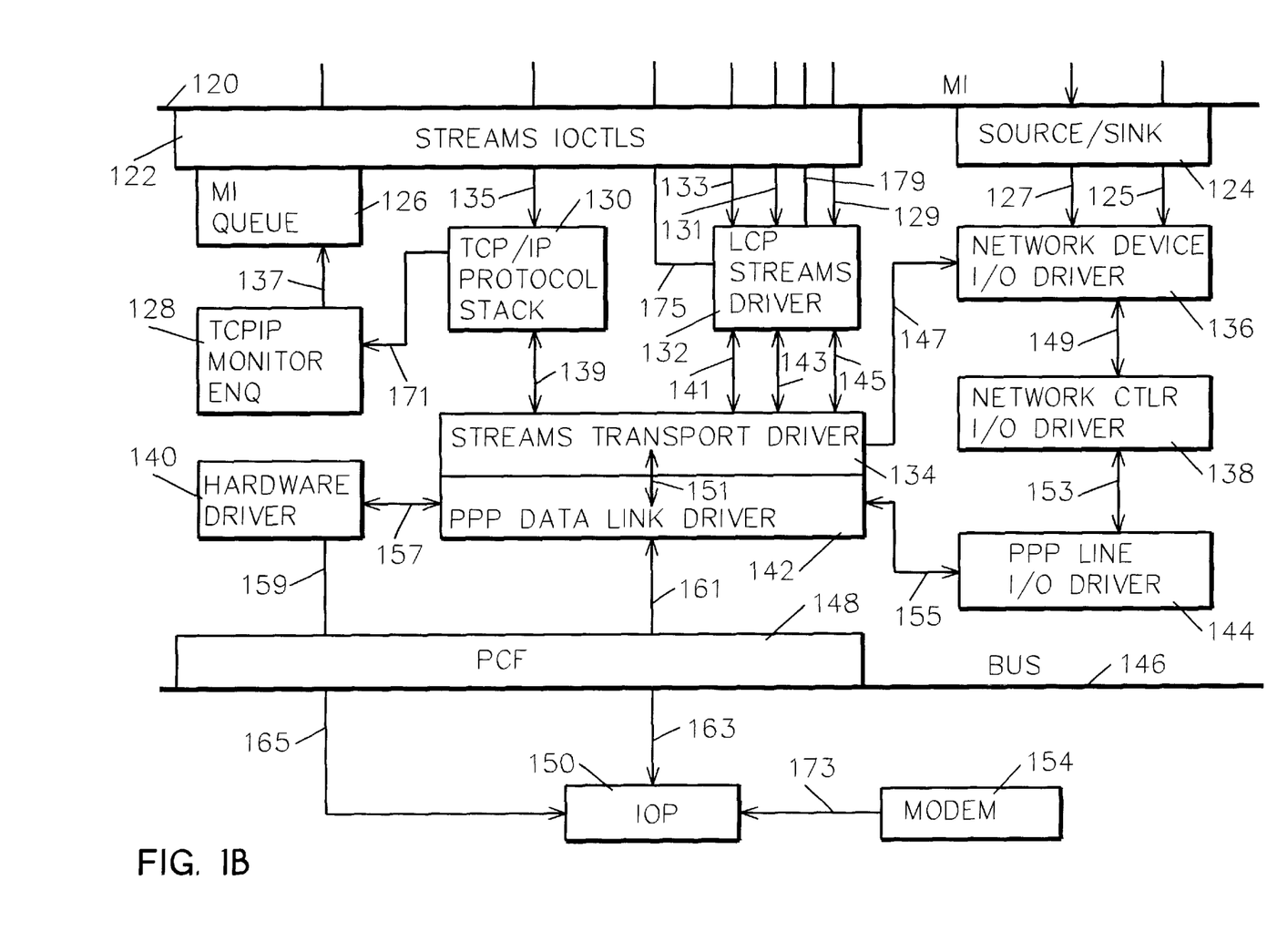

Referring to FIG. 1, a preferred system including components implementing the preferred method of the invention is illustrated. These components may be implemented as programming functions or modules. In this preferred embodiment, the lines interconnecting the various functional blocks represent functional interfaces, such as data or control flow, between the connected blocks. Those functional blocks and interfaces which are pertinent to execution of the preferred embodiment of the invention will be described hereafter following a high level description of the structure of the overall system.

QTCPIPMON TCP/IP monitor job 100 includes QTOCMON job 106 and monitor registry stack 104. QSYSWRK subsystem (user QTCP) PPP-DOD session job (also referred to as session manager) 102 includes queue 108, QTOCPPCM PPP connection manager 110, event monitor 152, QTOCPPSK TCP IFC/RTE IOCATL 112, network control protocol block 114 for TCP and NCP, and QTOCLCP link control protocol LCP 116. Also running above the machine interface 120 is device configuration module 118. Communication across machine interface 120 is by way of streams I/O controls (IOCTLS) 122 and source/sink 124.

Modules executing below machine interface 120 include MI queue 126, TCPIP monitor enqueue block 128, TCP/IP protocol stack 130, LCP streams driver 132, network device I/O driver 136, network controller I/O driver 138, hardware driver 140, streams transport driver 134, PPP data link driver 142, and PPP line I/O driver 144.

Executing at bus interface 146 is PCF block 148, and below the bus interface are IOP 150 and modem 154.

Line 101 represents the interface between connection manager 110 and monitor registry stack 104. Line 103 represents the interface between connection manager 110 and TCP IFC/RTE IOCATL block 112. Lines 105 and 183 represent the interface between connection manager 110 and LCP link control protocol block 116. Lines 109 and 127 represent the interface between connection manager 110 and network device I/O driver 136, via source sink 124. Lines 123 and 125 represent the interface between device configuration block 118 and network device I/O driver 136 via source/sink 124. Lines 107 and 129 represent the interface between connection manager 110 and streams driver 132 via streams I/O controls block 122. Line 185 represents the interface between queue 108 and connection manager 110. Line 117 represents the interface between network control protocol 114 and QTOCPPSK 112. Line 167 represents the interface between QTOCMON 106 and queue 108. Line 113 represents the interface between MI queue 126 and QTOCMON 106 via streams I/O control 122. Line 115 represents the interface between QTOCPPSK 112 and TCP/IP protocol stack 130 via streams IOCTLS 122. Lines 175 and 177 represent the interface between LCP streams driver 132 and event monitor 152 via steams IOCTLS 122. Lines 119 and 133 represent the interface between network control protocol 114 and LCP streams driver 132 via streams I/O controls 122. Lines 121 and 131, and lines 172 and 181, represent the interface between link control protocol 116 and streams driver 132 via streams I/O controls 122.

Line 137 represents the interface between TCPIP monitor enqueue block 128 and MI queue 126. Line 171 represents the interface between TCP/IP protocol stack 130 and TCP/IP monitor enqueue block 128. Line 139 represents the interface between stack 130 and driver 134. Line 151 represents the interface between drivers 134 and 142. Line 157 represents the interface between drivers 142 and 140. Lines 141, 143 and 145 represent the interface between drivers 132 and 134. Line 149 represents the interface between drivers 136 and 138. Line 147 represents the interface between drivers 134 and 136. Line 153 represents the interface between drivers 138 and 144. Line 155 represents the interface between drivers 142 and 144. Lines 159 and 165 represent the interface between driver 159 and IOP 150 via PCF 148. Lines 161 and 163 represent the interface between driver 142 and IOP 150 via PCF 148. Line 173 represents the interface between IOP 150 and modem 154.

Line 111 represents the interface between QTOCMON 106 and stack 104. Line 113 represents the interface between MI queue 126 and QTOCMON 106 via streams I/O controls 122.

In operation, the Dedicated Peer Dial-on-Demand process of the preferred embodiment of the invention includes the following logical parts (referred to hereafter as phases):
 a. Start Dedicated Peer Dial-on-Demand Session Manager Job
 b. Demand PPP Connection for Data Transfer
 c. PPP Connection Termination (Recycle)
 d. Answer Incoming Call from Peer
 e. Establish PPP Connection
 f. Terminate Dedicated Peer Dial-on-Demand Session Manager Job a. Start Dedicated Peer Dial-on-Demand Session Manager Job (Phase 202)

Referring to FIG. 1, in accordance with the preferred embodiment of the invention, responsive to a STRTCPPTP command starting session manager job 102, a PPP profile database (not shown) is read to gather specific information concerning the profile in question. In this case, the profile read will be a Dedicated Peer Dial-on-Demand (DOD) indicating to the Connection manager program 110 that Dedicated Peer Dial-on-Demand processing must occur.

Figure 2:
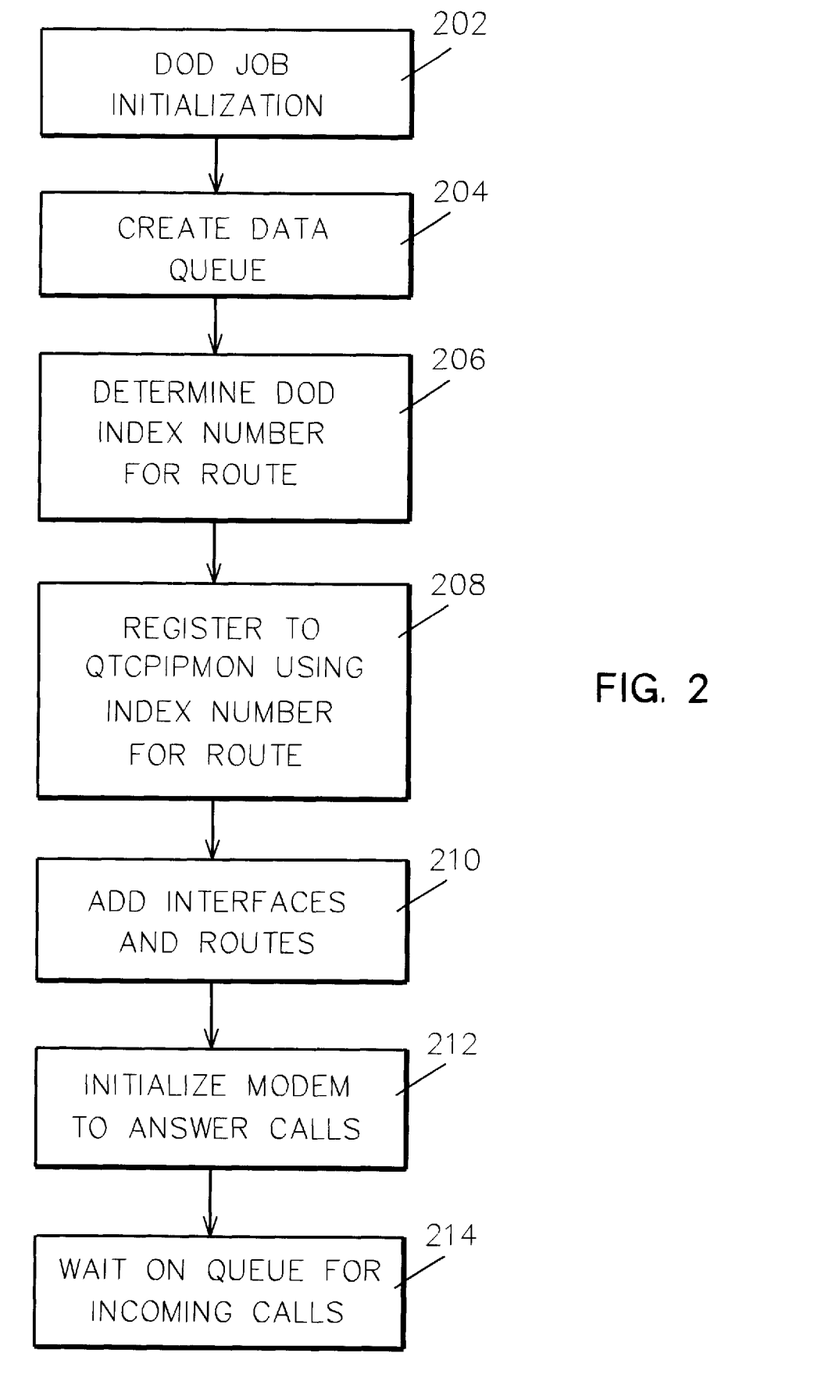
FIG. 2 illustrates the process steps executed by the connection manager of FIG. 1 during the initialization phase.

Referring to FIG. 2, responsive to job initialization phase 202, PPP connection manager 110 operates in step 204 to create data queue 108; in step 206 to determine the DOD index number for the route; in step 208 to register to QTCPIPMON 106 using the DOD index number from step 206; in step 210 to add interfaces and routes; in step 212 to initialize modem 154 to answer calls; and in step 214 to wait on queue 108 for incoming calls.

Referring further to FIG. 1 in connection with FIG. 2, execution of job initialization phase 202 occurs as follows:
1) As is represented by line 109 and steps 202 and 204, connection manager QTOCPPCM 110 issues source/sink MI REQIOs to activate the resources/session. A lock is then placed on the device associated with line/controller/device triumvirate being used to establish and maintain the requested PPP connection.
2) As is represented by line 101 and step 206, in order to utilize the TCP/IP monitor services, the PPP session manager job 110 calls QTOCMON program 106 to register on stack 104 this Dedicated Peer Dial-on-Demand profile. This registration passes to monitor 104 the following parameters that are used to uniquely identify the PPP session manager job:

Unique 16 byte identifier called the Dedicated Peer Dial-on-Demand Index. This is a combination of a job name and a unique Dedicated Peer Dial-on-Demand route index.
  Name of a data queue 108 used by the monitor job 100 to pass messages to the PPP session manager job 102.
  Name of the library which contains the data queue 108.

3) As is represented by line 103 and step 208, after registration with monitor job 100, session manager 102 will then call the QTOCPPSK module 112 to:
  Add a local TCP/IP interface using the IP address configured in the point-to-point profile
  Add any routes configured in the profile.

4) As is represented by line 115 and step 210, QTOCPPSK program 112 converts the request to add TCP/IP interfaces and routes to STREAMs based IOCTLs 122 which will flow down the TCP/IP stack 130 to the IP Route Manager (part of stack 130). The IP Route Manager will add the interface and associated routes to the routing table. The associated *DIRECT route and all *INDIRECT routes will be added in *ACTIVE (available) state allowing them to be considered during normal outbound IP datagram processing via the COMPUTE_Route( ) function. The Dedicated Peer Dial-on-Demand TCP/IP interface will not be activated until "demanded". Control returns back to the session manager job 102 where it will wait on the data queue 108 for a message demanding a PPP connection from the SLIC TCP/IP stack 130 via the monitor job 100.

5) As is represented by line 107 and step 212, QTOCPPCM connection manager 110 begins the task of activating the line/controller/device resources and enabling modem 154 to answer incoming calls from the remote Dedicated Peer Dial-on-Demand system. Connection manager 110 issues a request to the PPP Data Link Driver 142 to initialize answer mode and then sends commands to modem 154 to answer incoming calls.

6) As is represented by line 185 and step 214, Connection manager 110 then waits on queue 108 for either of the following:

A message demanding a PPP connection to the system, specified in the Dedicated Peer Dial-on-Demand profile, from the TCP/IP stack 130 via the monitor job 100. This is caused by a system user or program attempting to use the IP route, previously activated.

A message from the PPP Data Link Driver 142 via the LCP Streams Driver 132 indicating that modem 154 has answered an incoming call and established a physical connection to a remote (peer) system.

b. Demand PPP Connection for Data Transfer (Phase 240)

Referring to FIG. 1, in accordance with the preferred embodiment of the invention, when IP attempts to send a datagram to a host on a subnet reachable over a point-to-point link, PPP/IP protocol stack 130 demands a PPP connection, thus initiating a session start phase 240.

As mentioned previously, TCP/IP interfaces and routes to (sub)nets reachable over point-to-point links that are managed by a Dedicated Peer Dial-on-Demand session manager 102 will be added to the IP routing table (a table within stack 130) even though an underlying PPP connection isn't active. These interfaces and routes comprise a virtual connection path when activated without an underlying active PPP connection. This is a difference to the processing that normally occurs for DIAL or ANSWER profile modes currently supported by PPP for the system. Given that fact, the routes in the routing table will be available for use by the COMPUTE_Route( ) function when attempting to send an IP datagram to its addressed destination. The datagrams in question could either be generated from a local TCP/IP application, e.g., FTP, etc., or they could be datagrams that originated on some other remote system being forwarded by this system. In either case, once COMPUTE_Route( ) selects a route that is bound to a Dedicated Peer Dial-on-Demand interface AND the link-level point-to-point connection has not been established, the connection will be demanded.

Figure 3:
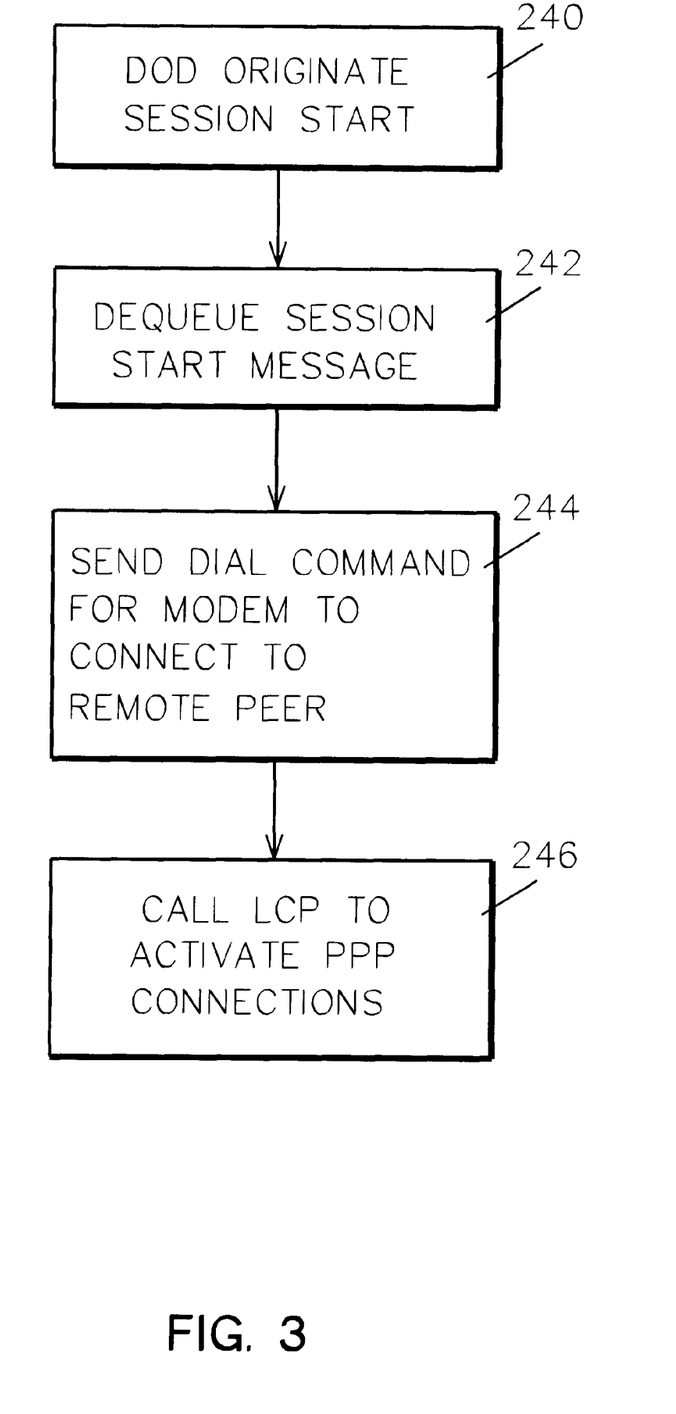
FIG. 3 illustrates the process steps executed by the connection manager of FIG. 1 during the originate, or dial, phase.

Referring to FIG. 3 in connection with FIG. 1, responsive to DOD originate session start phase 240, PPP connection manager 110 operates in step 242 to dequeue the session start message from queue 108; in step 244 to command modem 154 to connect to the appropriate remote peer; and in step 246 to call LCP streams driver 132 to activate the PPP connection.

Referring further to FIG. 1 in connection with FIG. 3, execution of DOD session start phase 240 occurs as follows:

1) IP 130 Outbound's SEND_Datagram( ) routine determines that the best route for a given datagram is one that is bound to an TCP/IP interface associated with a Dedicated Peer Dial-on-Demand link with no active connection. As is represented by line 171, IP 130 calls TcpIpMonitorEnq( ) routine 128 (a call/return program) with the following parameters to notify the session manager job 102 to start the associated processing required to activate a PPP connection:

16 byte Dedicated Peer Dial-on-Demand Index that associates the route and subsequent logical interface with a specific Dedicated Peer Dial-on-Demand profile and session manager job 102. This is found in the logical interface data structure 122. In addition, IP 130 enqueues the datagram on an internal linked list (internal, that is, to stack 130) located off the logical interface control block (not shown). The presence of a queued datagram will have the semantics that processing is underway to establish the PPP connection. Also, subsequent datagrams that hit the route in question will be added to this internal list in FIFO order.

2) As is represented by line 137, TcpIpMonitorEnq( ) routine 128 then formats a message with the specific route index value and places it on MI queue 126, a queue used by TCP/IP Monitor job 100 to receive asynchronous requests from the SLIC TCP/IP protocol stack 130.

3) As is represented by line 113, TCP/IP Monitor job 100 waits on a dequeue of queue 126 for messages from SLIC (a routine in stack 130). When one is received, it begins processing to determine what actions should be taken. To do so, monitor job 100 checks list 104 of registered users for a match to the route index passed up from IP 130. If a match is found, as is represented by line 167, a message is then enqueued to the queue 108 of the appropriate PPP Dedicated Peer Dial-on-Demand session manager job 102.

4) Referring to step 242 and line 185, at this time, QTOCP-PCM connection manager 110 of the target session manager 102 is waiting for a message to be enqueued to it's data queue 108. Upon receiving the message from monitor job 100, Connection manager 110 begins the task of establishing the PPP connection to the remote system identified in the Dedicated Peer Dial-on-Demand profile.

5) Referring to step 244 and lines 107, 129, 145 151, 161, 163 and 173, Connection manager 110 issues a request to PPP Data Link Driver 142 to initialize dial mode and then send commands to modem 154 (a) to NOT answer incoming calls and (b) to physically dial and connect to the requested remote system. When the physical connection is established, data line driver 142 sets an inactivity timer. The timer is reset when the link is used, and upon expiration signals data link driver 142 to close the connection due to inactivity.

6) Referring to step 246 and line 105, once the physical connection is established to the peer system, connection manager program 110 calls link control protocol (QTOCLCP) program 116 to establish a PPP connection with the remote system's PPP protocol machine.

7) Referring to line 117, upon completion of the PPP connection, the QTOCLCP program 116 calls the QTOCPPSK program 112 to issue a Start TCP/IP Interface request for the IP interface associated with the Dedicated Peer Dial-on-Demand profile. This will be the same IP interface that was previously added during the session manager job initialization phase noted previously.

8) Referring to lines 115, 135, QTOCPPSK program 112 builds and issues a Start TCP/IP Interface request STREAMS IOCTL 122 and passes that message down stream to be received by the Network Access Manager (NAM) component of the TCP/IP stack 130.

9) Referring to line 139, the NAM code of stack 130 then calls the MARK_RouteState( ) routine of streams transport driver 134 for the interface in question. Any queued IP datagram linked off the TCP/IP 130 logical interface control block will then be processed and sent using the new PPP connection. Once the data reaches PPP data link driver 142, the inactivity timer (which was discussed in item 5) is reset.

c. PPP Connection Termination (aka Recycle, or Session End) (Phase 230)

Referring to FIG. 1, termination or closure of a PPP connection in the following three ways:

First, locally by an inactivity timer firing in PPP Data Link Driver 142, in which case the local (aka, "this") system will initiate terminating the link-level connection. The inactivity time-out value is set in the PPP Line description.

Second, locally by a user issuing STRTCPPTP RESTART (*YES). This will restart the session job back to Connection manager 110, which is waiting on it's queue 108 for another Dedicated Peer Dial-on-Demand request.

Third, remotely from the peer system or the network, in which case PPP Data Link Driver 142 is notified that the Data-Set-Ready (DSR) status line of modem 154 has dropped, indicating the link-level connection has vanished.

Figure 4:
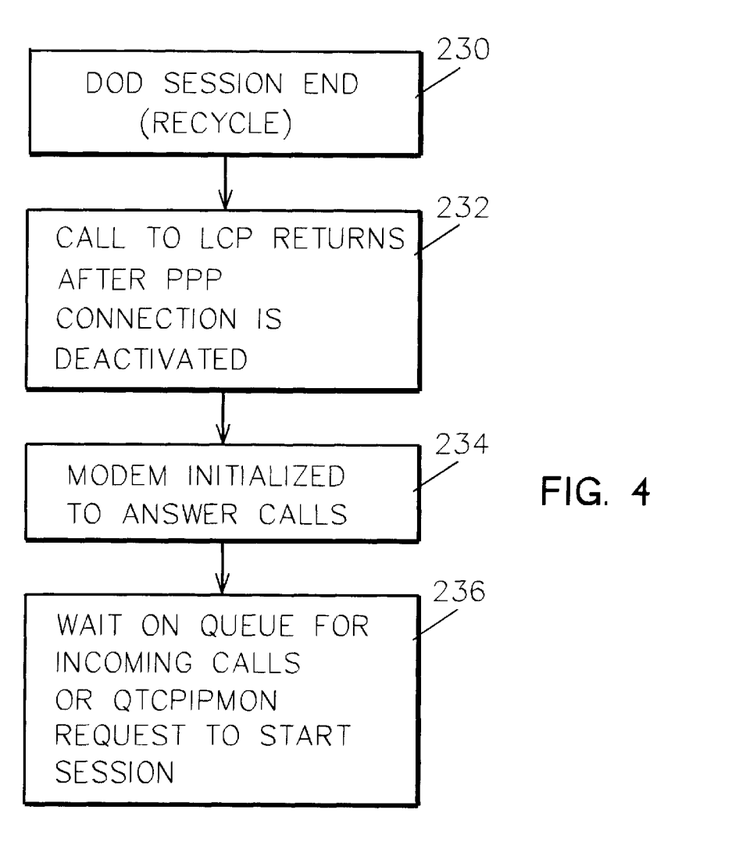
FIG. 4 illustrates the process steps executed by the connection manager of FIG. 1 during the session end, or recycle, phase.

Referring to FIG. 4 in connection with FIG. 1, PPP connection manager 110 is operable responsive to entering session end phase 230, in step 232 to recognize that a call to LCP 116 returns after a PPP connection is deactivated; in step 234 to initialize modem 154 to answer calls; and in step 236 to wait on queue 108 for incoming calls.

Referring further to FIG. 1 in connection with FIG. 4, regardless of how the connection is terminated, the following processing occurs.

1) As is represented by line 151, if the connection inactivity timer fires (aka, "pops") or DSR drops, PPP Data Link Driver 142 generates a message and passes it upstream to driver 134, indicating the physical connection to the remote (peer) system has been terminated.

2) As is represented by lines 179 and 181, LCP Streams Driver 132 notifies QTOCLCP program 116 that the PPP connection has been terminated.

3) As is represented by line 117, upon receipt of such notification, QTOCLCP program 116 calls the QTOCPPSK program 112 to issue an End TCP/IP Interface request for the IP interface associated with the Dedicated Peer Dial-on-Demand profile.

4) As is represented by lines 115 and 135, QTOCPPSK program 112 builds and issues a End TCP/IP Interface request STREAMS IOCTL 122 and passes that message down stream to be received by the Network Access Manager (NAM) component of TCP/IP stack 130. The NAM code of stack 130 then calls the MARK_RouteState( ) routine (not shown in diagram) for the interface in question for any clean-up.

5) As is represented by line 183 and step 232, QTOCLCP program 116 returns to QTOCPPCM connection manager 110 to finish ending the physical connection.

6) As is represented by lines 107 and 129, and step 234, Connection manager 110 then (a) issues a request to the PPP Data Link Driver 142 to initialize answer mode, and (b) sends commands to modem 154 to answer incoming calls.

7) As is represented by line 108 and step 236, Connection manager 110 then waits on queue 108 for a either of the following:

A message demanding a PPP connection to the system, specified in the Dedicated Peer Dial-on-Demand profile, from TCP/IP stack 130 via monitor job 100. This is caused by a system user or program attempting to use the IP route, or virtual connection path, previously activated.

A message from PPP Data Link Driver 142 via LCP Streams Driver 132 indicating that the modem has answered an incoming call and established a physical connection to a remote (peer) system.

d. Answer Incoming Call from Peer (Phase 220)

Referring to FIG. 1, an answer phase is initiated when a PPP connection is demanded by a remote (peer) system when it attempts to send a datagram to this local (peer) system.

Figure 5:
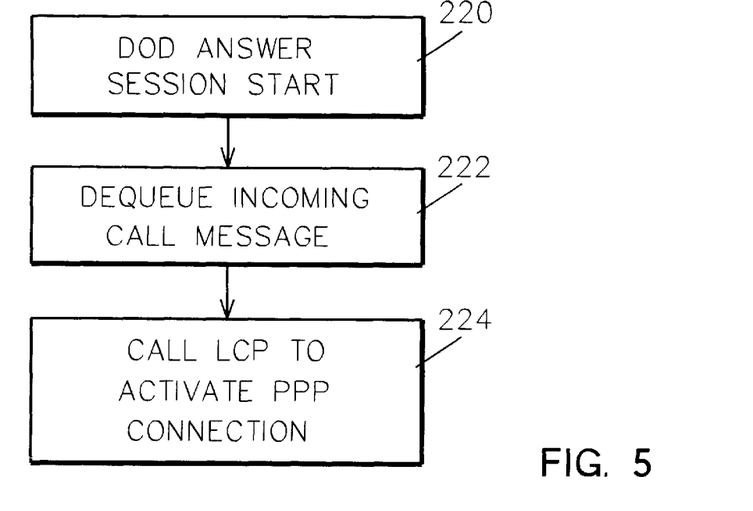
FIG. 5 illustrates the process steps executed by the connection manager of FIG. 1 during the answer phase.

Referring to FIG. 5 in connection with FIG. 1, during answer phase 220, PPP connection manager 110 is operable in step 222 to dequeue incoming call messages; and in step 224 to call LCP 116 to activate a PPP connection.

Referring further to FIG. 1 in connection with FIG. 5, the flow of control when the connection request is successful is as follows.

1) As is represented by lines 173, 161, 151 and 141, modem 154 indicates it has established a physical connection to a remote (peer) system when it activates the DSR (Data Set Ready) status line to I/O processor (IOP) 150. PPP Data Link Driver 142 passes this status to the LCP Streams Driver 132.

2) As is represented by lines 175, 177 and 169, LCP Streams Driver 132 then enqueues a message on the queue 108 being monitored by Connection manager 110.

3) As is represented by lines 167 and 169 and step 222, at this time, Connection manager 110 of this session manager 102 is waiting for a message to be enqueued to it's data queue 108. Upon receiving the message via line 169 from LCP Streams Driver 132, Connection manager 110 begins the task of establishing the PPP connection to the remote system identified in the Dedicated Peer Dial-on-Demand profile.

4) As is represented by line 105 and step 224, with the physical connection already established by modem 154 to the remote peer system, connection manager 110 then calls QTOCLCP 116 to establish a PPP connection with the remote system's PPP protocol machine.

5) As is represented by line 117, upon completion of the PPP connection, QTOCLCP 116 calls QTOCPPSK 112 to issue a Start TCP/IP Interface request for the IP interface associated with the Dedicated Peer Dial-on-Demand profile. This will be the same IP interface that was previously added during the session manager job 102 initialization phase 202.

6) As is represented by lines 115 and 135, QTOCPPSK 112 builds and issues a Start TCP/IP Interface request STREAMS IOCTL 122 and passes that message down stream to be received by the Network Access Manager (NAM) component of the TCP/IP stack 130.

7) As is represented by line 139, the NAM code of stack 130 will then call the MARK_RouteState( ) routine for the interface in question. Any queued IP datagram linked off the TCP/IP logical interface control block will then be processed and sent using the new PPP connection. Once the data reaches the PPP data link driver 142, the inactivity timer (which was discussed in item 5) will be reset.

f. Terminate Dedicated Peer Dial-on-Demand Session Manager Job (Phase 250)

Finally, referring to FIG. 1, a Dedicated Peer Dial-on-Demand session manager 102 job is ended via an ENDTCPPTP command.

Figure 6:
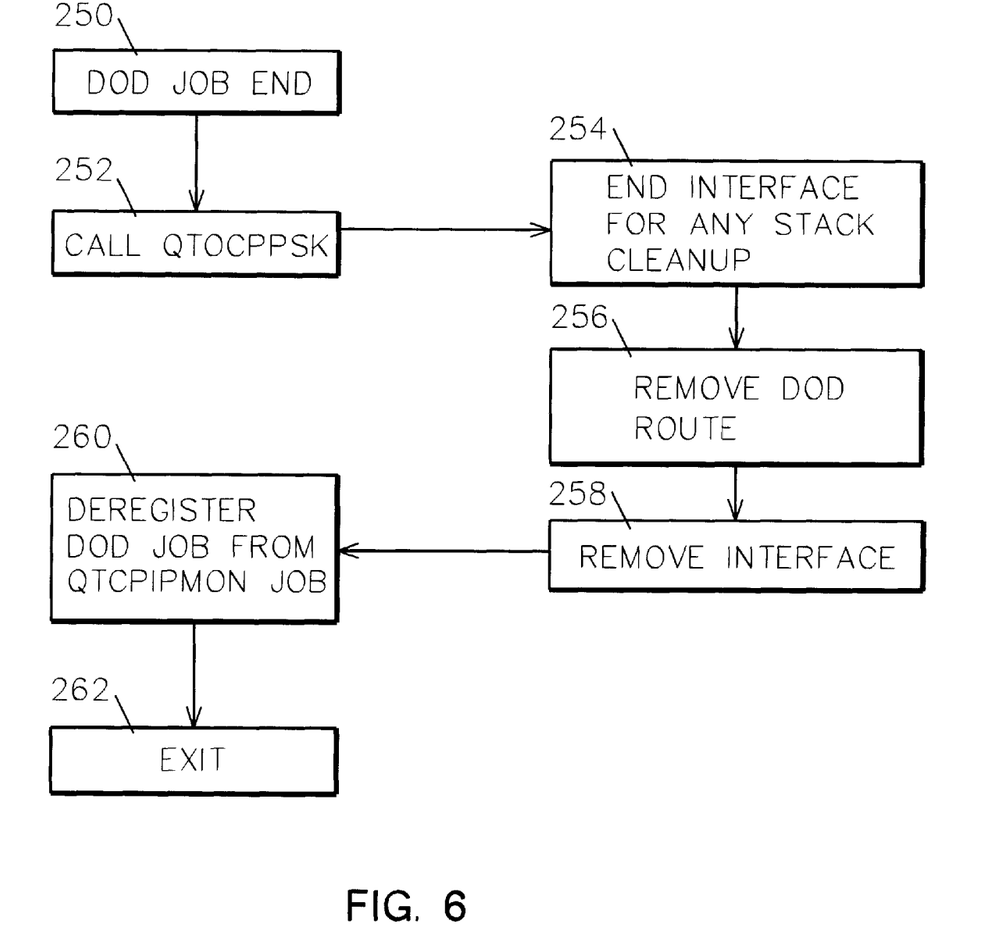
FIG. 6 illustrates the process steps executed by the connection manager of FIG. 1 during the job end phase.

Referring to FIG. 6 in connection with FIG. 1, PPP connection manager 110 is operable during job end phase 250 in step 252 to call QTOCPPSK 112; in step 260 to deregister the DOD session job 102 from QTCPIPMON job 106; and in step 262 to exit. QTOCPPSK 112 is responsive to the call in step 252, in step 254 to end the interface for any stack 130 cleanup; in step 256 to remove the DOD route; and in step 258 to remove the interface.

Job end phase 250 executes as follows. Assume the Connection manager 110 is waiting on its data queue 108 for a message to establish a PPP connection to the remote (peer) system.

1) As is represented by line 103, while waiting, session manager job 102 event handler 152 receives an end job event which causes Connection manager 110 to call QTOCPPSK program 112 to first end the current PPP interface and then to remove all local TCP/IP interfaces and routes previously added on behalf of the Dedicated Peer Dial-on-Demand profile services by session manager 102.

Even though the interface is not started it still must be ended to allow TCP/IP stack 130 to 'clean-up' any outstanding packets that could be destined for that interface.

2) As is represented by lines 254 and 256 and steps 252, 254, 256 and 258, QTOCPPSK program 112 (a) converts the request(s) to End TCP/IP interface and Remove TCP/IP interface and (b) routes streams based IOCTLs 122 which flow down the TCP/IP stack 130 to the IP Route Manager (a component of stack 130). The TCP/IP stack 130 IP Route Manager removes the routes and interfaces from the stack 130 IP routing table.

3) As is represented by line 101 and step 260, Connection manager 110 calls QTOCMON 106 to de-register this Dedicated Peer Dial-on-Demand profile 102 with the monitor job 100. After deregistration with monitor job 100, session manager job 102 ends.

Advantages Over the Prior Art

It is an advantage of the system and method of the preferred embodiment of this invention that there is provided an improved dial-on-demand communications method and system.

It is a further advantage the invention that there is provided an improved dial-on-demand communications method and system which reduces the cost and complexity of mission critical dedicated peer to peer communications.

It is a further advantage of the invention that there is provided a dedicated peer to peer connection which requires only a single line for both incoming and dial-out communications.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention. Further, selected components described or referred to as programming modules or procedures may be implemented in logic circuits (hardware).

Accordingly, the scope of protection of this invention is limited only by the following claims and their equivalents.

We claim:

1. A method for communicating between a local peer node and a single predetermined remote peer node in a switched point-to-point protocol (PPP) network, comprising the steps executed under system program control of:
   configuring under system software control a single, externally controlled communication modem at a local peer node dedicated as a virtual point-to-point protocol route for establishing a physical connection path to said single predetermined remote peer node;
   initializing under said system software control said communication modem at said local peer node for answer mode;
   reconfiguring under said system software control said communication modem for dial out mode when said local peer node initiates a call to said single predetermined remote peer node by routing to said remote peer node a PPP data packet by way of said physical connection path; and
   upon completing said call, returning under said system software control said communication modem to said answer mode dedicated to said single predetermined remote peer node thereby minimizing on-demand costs relative to maintaining a physical connection between said peer nodes.

2. The method of claim 1, said returning step further comprising the step of monitoring said single communication modem for receipt of data from said single predetermined remote peer node.

3. A communications method for communicating between peer nodes including a local node and one, predetermined remote node interconnected in a point-to-point dial up network, comprising the steps executed at said local node of:
   during a job initialization phase,
      registering a dial-on-demand job;
      creating a dial-on-demand interface;
      creating a data queue;
      initializing a modem to answer calls from said one, predetermined remote node;
      waiting on said data queue for an incoming call from said one, predetermined remote node or a start session request;
   during an originate session phase responsive to a start session request,
      receiving a data packet for communication to said remote node;
      loading said data packet to said data queue;
      operating said modem to dial said remote node;
      activating a connection over said interface from said local node to said remote node;
      transferring said data packet over said connection to said remote node;
   during a session end phase,
      deactivating said connection;
      initializing said modem to answer calls only from said one, predetermined remote node;
      waiting on said data queue for an incoming call from said one, predetermined remote node or a start session request;
   during an answer session phase responsive to said modem signaling receipt of an incoming call from said one, predetermined remote node, said receipt being enqueued to said data queue,
      dequeuing receipt of said incoming call from said data queue;
      activating a connection over said interface from said local node to said remote node;
      transferring data packets with respect to said remote node; and
   during a job end phase,
      ending said interface;
      releasing said data queue; and
      deregistering said dial-on-demand job.

4. A system for communicating between peer nodes in a network, comprising:
   means for configuring a single communication modem at a local peer node as a virtual point-to-point protocol route for establishing a physical connection path dedicated to a single predetermined remote peer node;
   means for initializing said communication modem at said local peer node for answer mode with respect to said single predetermined remote peer node;
   means for reconfiguring said communication modem for dial out mode when said local peer node initiates a call to said single predetermined remote peer node by routing to said remote peer node a data packet by way of said physical connection path; and means responsive upon completing said call for returning said communication modem to said answer mode with respect to said single predetermined remote peer node.

5. The system of claim 4, further comprising means responsive to returning said communication modem to said answer mode for monitoring said single communication modem for receipt of data from said single predetermined remote peer node.

6. A program storage device readable by a machine, tangibly embodying a program of instructions executable by a machine to perform method steps for communicating between peer nodes in a network, said method steps comprising:

configuring a single communication modem at a local peer node as a virtual point-to-point protocol route for establishing a physical connection path dedicated to a single predetermined remote peer node;

initializing said communication modem at said local peer node for answer mode;

reconfiguring said communication modem for dial out mode when said local peer node initiates a call to said single predetermined remote peer node by routing to said remote peer node a data packet by way of said physical connection path; and upon completing said call, returning said communication modem to said answer mode with respect to said single predetermined remote peer node.

7. The program storage device of claim 6, said method steps further comprising the step responsive to said returning step of monitoring said single communication modem for receipt of data from said single predetermined remote peer node.

8. An article of manufacture comprising:

a computer useable medium having computer readable program code means embodied therein for communicating between peer nodes in a network, the computer readable program means in said article of manufacture comprising:

computer readable program code means for causing a computer to effect configuring a single communication modem at a local peer node as a virtual point-to-point protocol route for establishing a physical connection path dedicated to a single predetermined remote peer node;

computer readable program code means for causing a computer to effect initializing said communication modem at said local peer node for answer mode;

computer readable program code means for causing a computer to effect reconfiguring said communication modem for dial out mode when said local peer node initiates a call to said single predetermined remote peer node by routing to said remote peer node a data packet by way of said physical connection path; and computer readable program code means for causing a computer to effect, upon completing said call, returning said communication modem to said answer mode.

9. A computer program product for controlling the operation of computing device for communicating between a local peer node and a predetermined remote peer node in a switched point-to-point protocol (PPP) network according to method steps comprising:

configuring a single communication modem at a local peer node dedicated as a virtual point-to-point protocol route for establishing a physical connection path to said predetermined remote peer node;

initializing said communication modem at said local peer node for answer mode;

reconfiguring said communication modem for dial out mode when said local peer node initiates a call to said predetermined remote peer node by routing to said remote peer node a PPP data packet by way of said physical connection path; and upon completing said call, returning said communication modem to said answer mode thereby minimizing on-demand costs relative to maintaining a physical connection between said peer nodes.

10. A program storage device readable by a machine, tangibly embodying a program of instructions executable by a machine to perform method steps for communicating between peer nodes in a network including a local node and one, predetermined remote node interconnected in a point-to-point dial up network, said method steps comprising:

during a job initialization phase,
registering a dial-on-demand job;
creating a dial-on-demand interface;
creating a data queue;
initializing a modem to answer calls from said one, predetermined remote node;
waiting on said data queue for an incoming call from said one, predetermined remote node or a start session request;

during an originate session phase responsive to a start session request,
receiving a data packet for communication to said remote node;
loading said data packet to said data queue;
operating said modem to dial said remote node;
activating a connection over said interface from said local node to said remote node;
transferring said data packet over said connection to said remote node;

during a session end phase,
deactivating said connection;
initializing said modem to answer calls only from said one, predetermined remote node;
waiting on said data queue for an incoming call from said one, predetermined remote node or a start session request;

during an answer session phase responsive to said modem signaling receipt of an incoming call from said one, predetermined remote node, said receipt being enqueued to said data queue,
dequeuing receipt of said incoming call from said data queue;
activating a connection over said interface from said local node to said remote node;
transferring data packets with respect to said remote node; and during a job end phase,
ending said interface;
releasing said data queue; and
deregistering said dial-on-demand job.

* * * * *